(12) United States Patent
Boiko et al.

(10) Patent No.: US 8,603,420 B2
(45) Date of Patent: Dec. 10, 2013

(54) GALVANIC WASTE SLUDGE TREATMENT AND MANUFACTURING OF NANO-SIZED IRON OXIDES

(75) Inventors: Vladimir Boiko, Kiryat Malachi (IL); Reuben Schapiro, Rehovot (IL)

(73) Assignee: Green Future Ltd., Rehovot (IL)

( * ) Notice: Subject to any disclaimer, the term of this patent is extended or adjusted under 35 U.S.C. 154(b) by 4 days.

(21) Appl. No.: 13/393,643

(22) PCT Filed: Sep. 7, 2010

(86) PCT No.: PCT/IL2010/000737
§ 371 (c)(1),
(2), (4) Date: Mar. 1, 2012

(87) PCT Pub. No.: WO2011/030338
PCT Pub. Date: Mar. 17, 2011

(65) Prior Publication Data
US 2012/0156497 A1    Jun. 21, 2012

(30) Foreign Application Priority Data

Sep. 10, 2009   (IL) .......................................... 200860

(51) Int. Cl.
*C01B 7/00* (2006.01)
(52) U.S. Cl.
USPC ........... 423/140; 423/141; 423/142; 423/209; 423/421; 423/488; 423/531
(58) Field of Classification Search
USPC .................. 423/140–142, 209, 421, 488, 531
See application file for complete search history.

(56) References Cited

U.S. PATENT DOCUMENTS

| | | | |
|---|---|---|---|
| 3,304,246 A | 2/1967 | Fukui et al. |
| 3,544,309 A | 12/1970 | Fletcher et al. |
| 3,800,024 A | 3/1974 | Forsell |
| 4,197,139 A | 4/1980 | Hjersted |
| 4,255,407 A | 3/1981 | Puurunen |
| 4,382,916 A | 5/1983 | Beecher |
| 5,149,515 A | 9/1992 | Karner |
| 5,244,551 A | 9/1993 | Brucken |
| 6,207,120 B1 | 3/2001 | Belmonte |
| 6,451,280 B1 | 9/2002 | Lebl |
| 7,008,602 B2 | 3/2006 | Smith et al. |
| 7,108,903 B2 | 9/2006 | Saito et al. |
| 2008/0159933 A1 | 7/2008 | Corbin et al. |
| 2008/0193365 A1* | 8/2008 | Coustry et al. ................ 423/421 |
| 2009/0127127 A1 | 5/2009 | Jones |

FOREIGN PATENT DOCUMENTS

| | | |
|---|---|---|
| CN | 1974853 A | 6/2007 |
| WO | 01/49901 | 7/2001 |
| WO | 2009/075710 | 6/2009 |

OTHER PUBLICATIONS www.oit.doe.gov, Jun. 2000, Douglas Olsen Green Technology Group, Sharon, CT.
Rane et al., J.Mat.Sci., 16, pp. 2387-2397, 1981.
Hermanek et al., J.Mat.Chem., 16, pp. 1273-1280, 2006.
Zboril et al., J.Pys.Status Solidi, 1, pp. 3583-3588, 2004.
Zboril et al., Internat.Sympos.Indust.Applic.of the Mossbauer Effect, 765, pp. 257-262, 2005.
Ashok et al., J.Nanosci.Nanotech., 7, pp. 2029-2035, 2007.
Angerman et al., J.Mat.Sci., 43, pp. 5123-5130, 2008.
IPRP CH I of corresponding PCT application, 8 pages—mailed Mar. 13, 2012.
Communication from a foreign patent office in a counterpart foreign application not more than three months prior to the filing of the information disclosure statement—May 6, 2013.
European search report from a foreign patent office in a counterpart foreign application—11 pages—Apr. 15, 2013.
English language abstract for CN20061016272—Method for recycling pickling water hydrochloric acid and reclaiming nanometer iron power and carbon monoxide in steel industry—it is believed to be published at least on Jun. 6, 2007.
Angermann et al., Synthesis of magnetite nanoparticles by the thermal decomposition of ferrous oxalate dihydrate, J. Mater. Sci (2008) 43:5123-5130.
Rane et al., Thermal decomposition of ferrous oxalate dihydrate studied by direct current electrical conductivity measurements. Journal of Materials Science 16 (1981) 2387-2397.
Hermanek et al., Thermal behavior of iron(II) oxalate dihydrate in the atmosphere of its conversion gases, Journal of Materials Chemistry, 2006 16, 1273-1280.
English language abstract for JP19750136929—Treating metal pickling liqs. for recycle by addn. of acids or oxidizing agents to ppte. dissolved metal salts—it is believed to be published at least on May 20, 1977.

* cited by examiner

*Primary Examiner* — Steven Bos
(74) *Attorney, Agent, or Firm* — Roach Brown McCarthy & Gruber, P.C.; Kevin D. McCarthy

(57) ABSTRACT

The invention enables processing waste sludge after galvanic treatment of metals, and particularly recycling spent pickling acids after pickling. Provided is an environmentally friendly process, which yields acids for reuse, and pure nano-sized iron pigments as a side product.

9 Claims, 1 Drawing Sheet

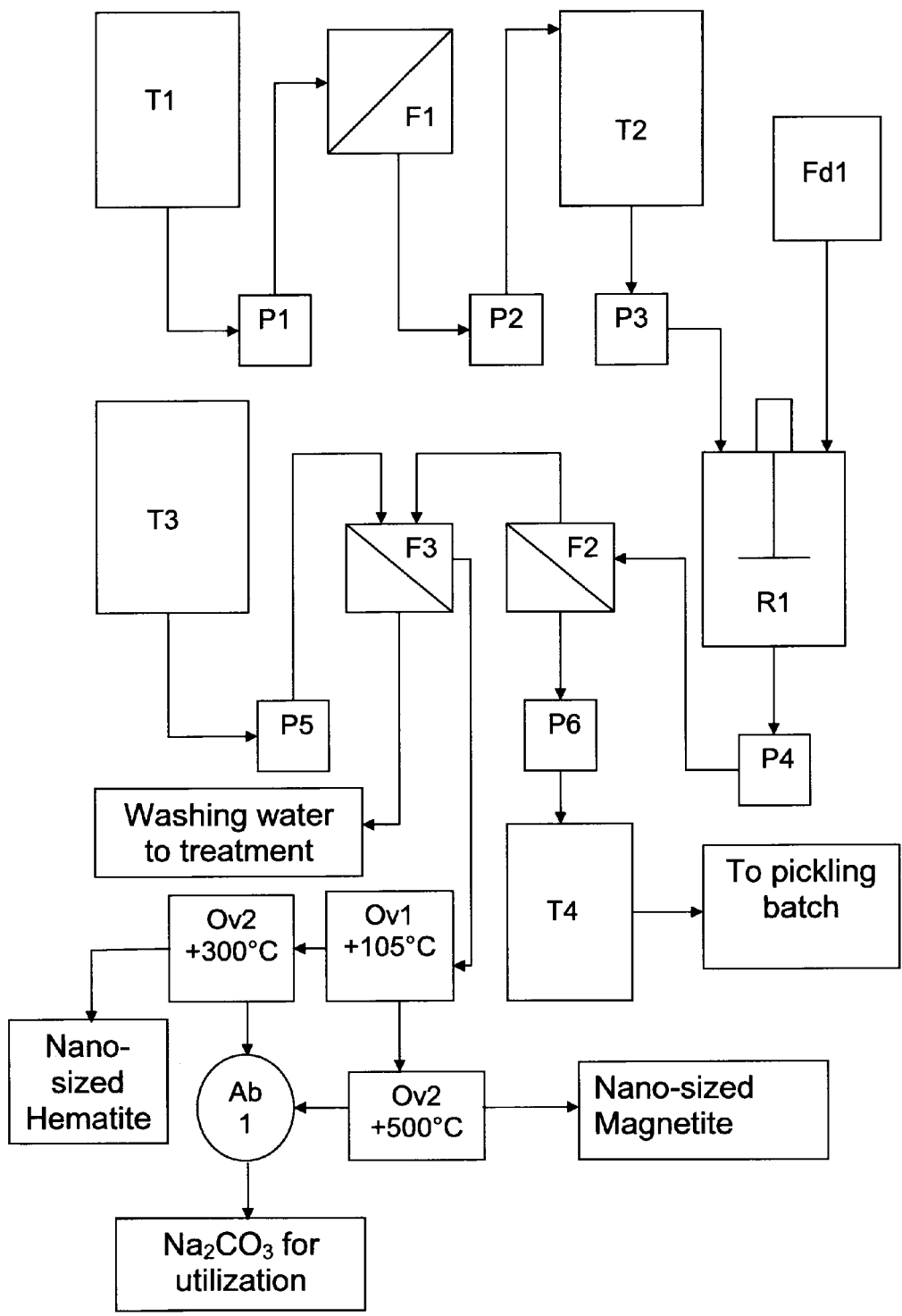

GALVANIC WASTE SLUDGE TREATMENT AND MANUFACTURING OF NANO-SIZED IRON OXIDES

REFERENCE TO CO-PENDING APPLICATIONS

Priority is claimed as a 371 of international application number PCT/IL2010/000737, filed on Sep. 7, 2010; which claims priority to Israeli Patent application number 200860, filed on Sep. 10, 2009.

FIELD OF THE INVENTION

The present invention relates to processing waste sludge after galvanic treatment of metals, particularly after pickling. Recycled are acids with inhibitor additives, and provided are nano-sized iron pigments.

BACKGROUND OF THE INVENTION

Pickling is a treatment of metallic surfaces before subsequent processing, such as extrusion, painting, galvanizing, or plating, comprising removing oxides and rust with a solution containing strong mineral acids with iron dissilving inhibitor additive, called pickling liquer. The two acids commonly used are hydrochloric acid and sulfuric acid. Spent pickle liquor is considered a hazardous waste by EPA. Once, spent pickle liquors were land disposed by steel manufacturers after lime neutralization, but nowadays it should rather be recycled or regenerated.

When manufacturing refined steel plates, pipes, etc., the steel plate is usually drawn through the acid base as a continuous strip. The hydrochloric or sulfuric acid in the basin gradually looses its pickling effect and reaches a maximum iron content, becoming a waste sludge. The basin is then emptied, and fresh acid is fed instead. There are several industrial methods of treating the galvanic waste sludge, which include three basic technologies. The first technology employs neutralizing the acid by $Ca(OH)_2$, $Na_2CO_3$, NaOH, KOH, or $NH_4(OH)$, separating a solid precipitate, and recycling water. Such technology is described in U.S. Pat. Nos. 3,304,246, 3,544,309, and 3,800,024. In the last reference, the ions are selectively precipitated in two steps by adjustment of the pH value. The disadvantages of the neutralization methods include the loss of the acid, and the complexity of separating hydroxides and treating saline water, which also result in high costs.

The second technology includes heating in two stages of the galvanic waste sludge in order to evaporate water and to recycle acid (200-500° C.), followed by producing metal oxides during the calcination at high temperatures (850° C.). Such techniques are described in U.S. Pat. Nos. 4,197,139, 5,149,515, 5,244,551, and 6,451,280, relating to a process for regenerating spent acid liquor, comprising feeding into a reactor, having a first heating zone, a substantial portion of the liquid from the spent acid to produce acid vapors and metal salts without decomposing the acid. The metal salts are transferred to a second heating zone where the salts are roasted to form metal oxides. The acid vapors from the primary roasting furnace are then transferred to an absorption column to regenerate the acid. The first heating zone is operated at a temperature below the decomposition temperature of the acid and the metal salts. The second heating zone operates at a higher temperature to completely oxidize the metal salts. The disadvantages of the technology include very high energy consumption, production of dangerous, very corrosive gases, and low quality of produced metal oxides.

The third technology regenerates spent pickling acid by adding fresh strong acid to preconcentrated galvanic waste sludge, and manufactures iron salts by crystallization. The regenerated acid is reused in the pickling process, and the iron salt is sold as a by-product after washing. Such technology is described in U.S. Pat. Nos. 4,255,407, 4,382,916, WO/2001/049901 and WO/2009/075710. This technology is advantageous because it allows to regenerate spent pickling acid and to remove dissolved metal (for example iron) as a by-product (for example, iron sulfate heptahydrate). The technology is considered to be a progressive one, for example by Green Technology Group, which published it as an innovative closed-loop process (Published in the WEB www.oit.doe.gov in June 2000, Douglas Olsen Green Technology Group, Sharon, Conn.). Disadvantages may include high energy consumption for the acid evaporation or waste sludge concentration, difficulties with the acids separation and with product washing. It is therefore an object of the present invention to regenerate hydrochloric or sulfuric acid from galvanic waste sludge, and to recycle it to the repeated pickling process, without the drawbacks of the prior methods.

It is another object of this invention to regenerate hydrochloric or sulfuric acid from galvanic waste sludge or from used pickling liquor, while utilizing dissolved iron.

It is further an object of this invention to regenerate hydrochloric or sulfuric acid from galvanic waste sludge or from used pickling liquor, while utilizing dissolved iron, without neutralizing the acids or concentrating them by heat-evaporation.

It is still another object of this invention to recycle dissolved iron from the waste sludge or pickling used liquor by adding a material capable of precipitating said iron out of the solution and separating it.

It is a further object of this invention to recycle dissolved iron from the waste sludge or pickling liquor by precipitating and washing, followed by converting the washed material to a useful product Other objects and advantages of present invention will appear as description proceeds.

SUMMARY OF THE INVENTION

The present invention provides a process for recycling spent pickling acids, comprising i) providing a spent pickling liquor comprising hydrochloric or sulfuric acid, and dissolved iron; ii) measuring the concentration of said dissolved iron; and iii) adding solid oxalic acid into said liquor; iv) stirring the mixture and reacting said dissolved iron with said added oxalate; v) removing the formed solid iron oxalate from said mixture; thereby obtaining a solid iron oxalate, and regenerated acids for repeated use in pickling. Said oxalic acid is added in a an amount corresponding to 75-80% of the stoichiometric amount necessary for the complete reaction with said dissolved iron. Said solid iron oxalate is preferably dried, and calcined to provide a pure nanopowder of iron oxide. The process according to the invention preferably employs washing said solid iron oxalate by water till the pH of 4.5-7 in the wash water, drying said washed iron oxalate at 90-105° C. thereby obtaining a powder of iron oxalate dihydrate, and calcining the dried iron oxalate dehydrate thereby obtaining a powder of iron oxide. In one aspect of the invention, the recycling process further comprises washing and drying said solid iron oxalate, and calcining the dried iron oxalate at 200-300° C. in the atmosphere of dry air, thereby obtaining a red powder of nano-sized α-hematite. In other aspect of the invention, the recycling further comprises washing and drying said solid iron oxalate, and calcining the dried iron oxalate at 290-350° C. in the atmosphere of conversion gases, or alternatively at 450-500° C. in the atmosphere of nitrogen, thereby obtaining a black powder of magnetite. Said pickling liquor may comprise 10-15 g/l of hydrochloric or sulfuric acid, 3-5 g/l of inhibitor additive, and 130-150 g/l of $Fe^{2+}$ as ferrous chloride or ferrous sulfate. In a preferred alternative of the process according to the invention, carbon dioxide released during said calcining is absorbed into NaOH, if carbon monoxide is formed, it is preferably burned and then absorbed. Said monoxide is formed rather when producing said magnetite. Said α-hematite has usually a bulk density of 0.35-0.40 kg/l, and a particle size of 35-50 nm. Said magnetite has usually a bulk density of 0.45-0.50 kg/l, and a particle size of 30-60 nm. The process of the invention is an environmentally friendly process providing i) a recycled acid for repeated use in pickling; ii) pure nano powder of iron oxide; and iii) sodium carbonate.

The invention provides pure α-hematite having a bulk density of 0.35-0.40 kg/l, and a particle size of 35-50 nm, as well as pure magnetite having a bulk density of 0.45-0.50 kg/l, and a particle size of 30-60 nm. The particles usually exhibit spherical shape. The term "pure" in regard to the hematite and magnetite products comprises purity of at least 99.2 wt %, preferably more than 99.2 wt %, usually more than 99.5 wt %.

BRIEF DESCRIPTION OF THE DRAWING

The above and other characteristics and advantages of the invention will be more readily apparent through the following examples, and with reference to the appended drawing, wherein:

FIG. 1. is a schematic presentation of a process according to the invention.

DETAILED DESCRIPTION OF THE INVENTION

It has now been found that galvanic waste sludge or used pickling liquor can be easily processed, utilizing both the dissolved acids and the dissolved iron, in a surprisingly efficient and environmentally friendly manner, while recycling the acids and converting iron to precious nano-sized oxides. It has been found that adding powder of oxalic acid dihydrate to a waste pickling liquor obviates the drawbacks of the known methods, namely energy demanding steps of liquor thickening, or expensive and dangerous steps of neutralizing the acids. The acids, whether hydrochloric or sulfuric, can be regenerated and reused, while saving expensive materials and adhering to ever stricter environmental regulations. Advantageously, the process provides precious and demanded materials—pure iron oxide nano powders, which are used as pigments and in electronics, in cosmetics and in plastic industry.

Thus, the method of the invention enables to regenerate acids selected from the group consisting of hydrochloric acid or sulfuric acid, and is characterized in that the galvanic waste sludge is mixed with dry oxalic acid dihydrate, followed by removing the precipitate of iron (II) oxalate dihydrate. The obtained precipitate slurry is passed to a filter for solid separation and washing. The filtrate obtained is recycled to the pickling process. The washed iron (II) oxalate is passed to calcining oven for decomposition and for obtaining nano-sized iron oxides powder. The gases released during the iron oxalate's conversion to oxides are neutralized by NaOH.

The formation of iron oxalate can be achieved by simple reaction between concentrated solution of $FeCl_2$ (or $FeSO_4$) and dry oxalic acid dihydrate. The precipitated iron (II) oxalate dihydrate is washed and calcined while obtaining very useful and desired nano-sized iron oxides. Regarding by-products obtained during the galvanic waste treatment, ordinary iron oxide and iron (II) sulfate heptahydrate are mentioned in the published techniques. In contrast, the present invention provides expensive nano-sized iron oxides, such as hematite ($Fe_2O_3$) and magnetite ($Fe_3O_4$), from iron (II) oxalate. A process of the transformation of iron (II) oxalate into iron oxides has been described [see, for example, Rane K. S. et al.: J. Mater. Sci. 16 (1981) 2387-97; Hermanek M. et al.: J. Mater. Chem. 16 (2006), 1273-80; Zboril R, et al.: J. Phys. Status Solidi 1 (2004) 3583-8; Zboril R. et al.: Inernational Symposium in the Industrial Application of the Mossbauer Effect 765 (2005).257-62; Ashok G. K. et al.: J. Nanoscience Nanotechnol. 7 (2007) 2029-35; Angerman F. et al.: J. Mater. Sci. 43 (2008) 5123-30]. The instant invention employs said transformation for making nano-sized iron oxides as a by-products in the galvanic waste sludge treatment. One of oxides, magnetite ($Fe_3O_4$) is a pigment that is used, among others, as a pigment in transparent paints, inks, cosmetics, as catalyst, in plastics, in electronics. Other oxide, α-hematite (alpha hematite, $Fe_2O_3$) is used as a pigment for transparent paints, inks, cosmetics, as catalyst, and in plastics.

In one aspect of the invention, the environmentally friendly (green) process for regeneration of pickling acids, prevents disposal of hazardous acids, and further sequesters carbon dioxide, which may become a regulated end product, while eventually producing useful carbonates. So, the acids from galvanic spent liquor are returned for repeated use, dissolved iron provides expensive pure nanomaterial, and unpopular carbon dioxide is absorbed to provide a useful by-product; all that with minimal load on the environment, and without neutralizing the acids or concentrating them by heat-evaporation, without regular additions of fresh acid portions, and without crystallizing iron salts by condensing the liquor.

The process of the present invention enables to regenerate a wide range of hydrochloric or sulfuric acid concentrations from galvanic waste pickle liquor (shortly pickle liquor) containing ferrous slats (chloride or sulfate), while obtaining high-quality by-products, particularly nano-sized iron oxides.

In the method of the invention, the pickle liquor is filtered, to recover the solid contaminants, and collected in a storage feed tank. From the feed tank it is pumped into simple, acid resistant reactor with stirrer, the reactor comprising, for example, polypropylene. A dry crystalline oxalic acid dihydrate (99.6%) is added into the reactor, preferably in a weight amount corresponding to 75-80 wt % of iron (II) quantity in the galvanic waste liquor. The iron (II) chloride or sulfate is reacted with oxalic acid at ambient temperature. The complete reaction takes place during 4 h. As a result of reaction, the iron (II) oxalate dihydrate is precipitated and 75-80% of spent pickling hydrochloric (or sulfuric) acid are regenerated. A dissolution inhibitor (which is always in the used pickling liquor) prevents re-dissolution of the precipitated iron oxalate by the regenerated acid until its concentration is more 20%. The regenerated acid, about 12-14% hydrochloric or 18-20% sulfuric acid, is ready for the pickling process; it contains residual iron in an amount of about 20-25% iron (II) cations, and 3-5% of the inhibitor. The inhibitor does not participate in the reaction and only inhibites acid activity as in the galvanic basin. Besides, the acid quantity in the recycled liquor is defined by iron oxalate solubilty in the hydrochloric and sulfuric acids. The produced slurry, consisting of iron (II) oxalate dihydrate precipitate and the regenerated acid, is pumped into an acid resistance filter device for separation. The filtrate, the regenerated hydrochloric or sulfuric acid, is pumped into a storage tank to be reused. The cake of iron oxalate dihydrate is washed by fresh water till the pH of wash water is more than 4.5-5, and it is dried at +105° C. in a drying oven. The dry cake of iron (II) oxalate is calcined at +245-288° C. in the air atmosphere in order to produce nano-sized red iron oxide ($\alpha Fe_2O_3$-hematite), or it is calcinated without the presence of oxygen (comprising, for example, nitrogen or other gas atmosphere) at +320-488° C. in order to produce nano-sized black iron oxide ($Fe_3O_4$-magnetite). The produced iron oxides (red or black) do not require to employ a milling process, they are strongly dispersed (bulk density, for example, 0.35-0.5 kg/l), highly pure, and consisting of spherical particles with a size of, for example, about 35-60 nm. The conversion gases may be burned (CO), may be collected ($CO_2$) and then neutralized, for example with NaOH while obtaining sodium carbonate.

The hydrochloric (or sulfuric) acid regeneration and nano-sized iron oxides manufacturing of the present invention is schematically illustrated in FIG. 1, wherein the symbols have the following meanings:

T1—galvanic waste sludge storage tank;
T2—galvanic waste sludge feed tank;
T3—fresh water storage tank;
T4—regenerated pickling liquor storage tank;
R1—polypropylene reactor with stirrer;
P1-P6—pumps;
F1—galvanic waste sludge filter;
F2—iron oxalate separation filter;
F3—iron oxalate washing filter;
Ov1—iron oxalate drying oven;
Ov2—iron oxalate calcination oven (hematite production);
Ov3—iron oxalate calcination oven (magnetite production); and
Ab1—gas absorber with NaOH solution.

The pickle liquor usually contains 115-150 g/l of $Fe^{2+}$ (as ferrous chloride (or sulfate) cation, 10-15 g/l (1.2-1.5%) of HCl (or $H_2SO_4$) and up to 50 g/l of inhibitor additive. The pickle liquor is transferred by pump P1 and pump P2 through filter F1 from storage tank T1 into feed tank T2. From feed tank T2 it is transferred by pump P3 into polypropylene reactor R1 with stirrer. The 99.6% dry oxalic acid dihydrate ($H_2C_2O_4.2H_2O$) is added into reactor from feeder Fd1, in a mass quantity stoichiometrically corresponding to 75-80% of $Fe^{2+}$ cation mass in the waste pickling liquor is added. The chemical reaction takes place between ferrous chloride (1), or ferrous sulfate (2), and oxalic acid:

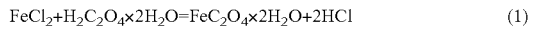
(1)

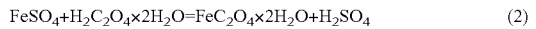
(2)

The reaction takes place at ambient temperature with stirring 150-200 rpm and it is complete after 4 h. The produced slurry of iron (II) oxalate dihydrate and hydrochloric or sulfuric acid is transferred by pump P4 from reactor R1 into filter F2 for separation. The filtrate of hydrochloric or sulfuric acid is transferred by pump 6 from filter F2 into storage tank T4 for use as a ready pickling liquor, contained 125-200 g/l (12.5-20%) HCl or $H_2SO_4$, 35-50 g/l of ferrous cations (ferrous chloride or ferrous sulfate) and about 3-5% of inhibitor additive. From storage tank T4 it is recycled into pickling batch. The cake of iron (II) oxalate dihydrate is transferred from filter F2 into filter F3 for washing by fresh water, which is pumped by pumps P5 from water storage tank T3 into filter F3. The washing process is finished at a pH of more than 4.5-5. The washing water is collected and it can be recycled into tank T3 after treatment. The washed cake of iron (II) oxalate dihydrate is transferred into drying oven Ov1 and it is dried at a temperature of 100-105° C. until a humidity of 0.5%. The cake of dried iron (II) oxalate dihydrate is transferred into oven Ov2 for calcinating in the air atmosphere or into oven 3 for calcinating in the atmosphere of the conversion gases or nitrogen. The conversion gases, released during the decomposition of ferrous oxalate, can thus serve and be reused in the process, further increasing the cost-efficiency and environmental friendliness of the whole process according to the invention. The iron (II) oxalate dihydrate calcination takes place in two stages. The first stage is a dehydration at +220° C. and the second stage is complete its thermal decomposition and oxidation at +245-288° C. in the air atmosphere, or complete decomposition in atmosphere of its conversion gases or nitrogen at 320-488° C. As a result of calcination in the oven Ov2 a nano-sized alpha-hematite ($\alpha Fe_2O_3$) is obtained. As a result of calcination in the oven Ov3 a nano-sized magnetite ($Fe_3O_4$) is obtained. The chemical reactions of iron (II) oxalate thermal decomposition are:

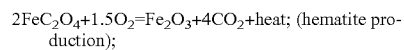

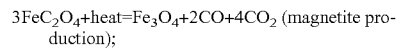

Produced nano-sized hematite and magnetite are dispersed by their own conversion gases in time of iron (II) oxalate decomposition, obtaining a fluffy powder. The produced conversion gases may be burned (CO), and then absorbed in the absorption column Ab1 by sodium hydroxide ($CO_2$). All experiments on the galvanic waste pickle sludge (liquor) treatment were made on the Pilot Plant with productivity 100-150 l/day.

A method for the recycling of spent pickling acids selected from the group consisting of hydrochloric acid or sulfuric acid, characterized in that the galvanic waste sludge is mixed with dry oxalic acid dihydrate that is removed the precipitate of iron (II) oxalate dihydrate and that is regenerated spent pickling acid. The slurry obtained is passed to a filter for solid separation and washing. The filtrate obtained is recycled to the pickling batch back. The washed iron (II) oxalate dihydrate is passed to calcining oven for decomposition and obtaining nano-sized iron oxides powder. The iron oxalate's conversion gases are neutralized by NaOH.

Thus, in a preferred embodiment of the invention, a method is provided for reprocessing spent pickling waste liquor, comprising adding oxalic acid and so sequestering about 75-90% of iron in insoluble oxalate, washing said solid iron oxalate by water till the pH of 4.5-7 in the wash water, drying said washed iron oxalate at 90-105° C. thereby obtaining a powder of iron oxalate dihydrate, and calcining the dried iron oxalate dehydrate. In the most preferred embodiment, the process further comprises washing said solid iron oxalate by water till the pH of the wash water is about 4.5-7 in, drying said washed iron oxalate at 90-105° C., preferably obtaining iron oxalate dehydrate, and calcining the dried iron oxalate at 200-300° C. in the atmosphere of dry air, thereby obtaining a red powder of nano-sized $\alpha$-hematite. The aqueous galvanic waste sludge usually consists of 10-15 g/l of hydrochloric or sulfuric acid, 3-5 g/l of inhibitor additive, and 115-150 g/l of $Fe^{2+}$ as ferrous chloride or ferrous sulfate. The sludge is preferably filtered and filled into acid resistance reactor with stirrer at ambient temperature, and it is mixed with quantity of dry oxalic acid dihydrate (99.6%) stoichiometric to 75-90% of $Fe^{2+}$. After adding oxalic acid, and stirred for a time sufficient for producing iron oxalate, usually about 4 hours, iron (II) oxalate dihydrate precipitates, whereby regenerated hydrochloric or sulfuric acid is formed. The regenerated quantity of hydrochloric or sulfuric acid is about 75-80% of spent pickling acid, containing residue of 30-50 g/l of $Fe^{2+}$ and 3-5 g/l of inhibitor additive. The regenerated hydrochloric or sulfuric acid is separated from slurry by filtration together with dissolved inhibitor additive and it is reused in the pickling process. The precipitated iron (II) oxalate dihydrate is separated from slurry by filtratioin, producing a filtration cake, to be further processed. The cake of iron (II) oxalate is is preferably washed by water till pH 4.5-7, and then it is preferably dried at a temperature of from +90 to +105° C. The dried cake of iron (II) oxalate dihydrate is calcined in an oven at 200-300° C. during 3 h in the dry air atmosphere, producing red nano-sized iron oxide ($\alpha Fe_2O_3$-hematite). The iron oxide ($\alpha Fe_2O_3$-hematite) need not be milled, it has a bulk density of 0.35-0.4 kg/l. The particle size is 35-50 nm at narrow distribution, 90% of the particles mass being in the said range. The purity of the product is usually 99.2-99.7%. Usually, iron oxide ($\alpha Fe_2O_3$-hematite) light powder consists of spherical particles. The said dried cake of iron (II) oxalate may be calcined in an oven at +290-350° C. over about 3 hours in the atmosphere of its own conversion gases, or alternatively at +450-500° C. in the nitrogen atmosphere, providing a black powder of super paramagnetic nano-sized iron oxide ($Fe_3O_4$-magnetite). The purity of the product is usually 99.5-99.8%. The iron oxide needs no milling, its bulk density being 0.45-0.5 kg/l, and its particle size being usually about 30-60 nm, at narrow distribution, about 90% particle mass being in said range. The powder usually consists of spherical particles. In a preferred embodiment of the invention, $CO_2$ gas obtained in the iron (II) oxalate thermal decomposition is absorbed in NaOH. In other preferred embodiment of the invention, CO gas obtained in the iron (II) oxalate thermal decomposition is burned and the formed $CO_2$ is absorbed in NaOH. The $Na_2CO_3$ obtained as a result of gases absorption is a by-product for sale.

The invention will be further described and illustrated in the following examples.

EXAMPLES

Example 1

The galvanic waste pickle liquor of the first example has the following composition: ferrous chloride, 130 g/l of $Fe^{2+}$, hydrochloric acid 15 g/l (or 1.5%), about 2.5% inhibitor additive, and balance water. After filtering 100 l of this liquor was fed to 150 l glass reactor with stirrer, and 22.5 kg (stoichiometric to 100 g/l of $Fe^{2+}$) of oxalic acid dihydrate were added into solution with stirring 150 rpm at ambient temperature (+24° C.). After oxalic acid dihydrate addition, the temperature of the mixture was decreased to +21° C. The reaction between ferrous chloride and oxalic acid started immediately and it was continued during 4 hours. The temperature of the mixture at the end of the reaction was ambient (+24° C.) again. As a result of reaction 32.2 kg of yellow precipitate of iron (II) oxalate dihydrate was obtained and 126 g/l of hydrochloric acid were regenerated. The total acid quantity in the slurry was achieved 141 g/l or 14.1%. Slurry of iron (II) oxalate dihydrate in the water solution of 14.1% hydrochloric acid was filtered on the membrane filter. The filtrate (82 liters) was collected and tested for the ferrous chloride and hydrochloric acid quantities. The analysis showed the presence, in filtrate, of 30 g/l of $Fe^{2+}$, 141 g/l of free hydrochloric acid, about 2.0% of inhibitor additive, and 80% balance water. The obtained solution was suitable for the use in the pickling process.

The cake of filtration contained 82% of solid material—iron (II) oxalate dihydrate and 18% of mother liquor of regenerated pickling acid. The cake of iron (II) oxalate dihydrate was washed by fresh water until visual absence of $Cl^-$ anions in the washing water. The $Cl^-$ anions presence was tested by addition of 1% solution of $AgNO_3$ into washing water (white precipitate of AgCl after addition of several drops of $AgNO_3$ solution into washing water). The washed cake of iron (II) oxalate dihydrate was dried in the drying oven at temperature +100-105° C. The weight of dry iron (II) oxalate dihydrate was 32.2 kg. It was thermally decomposed to get nano-sized iron oxides: 10 kg for the hematite production and 10 kg for the magnetite production.

According to the made TGA-DTG-DSC analysis (laboratory of Ben Gurion University) the produced iron (II) oxalate dihydrate is decomposed by two stages in the air atmosphere. The first stage is dehydration in the temperature interval +187.16-239.93° C. (peak 201.35° C.) and the second stage is oxidation in the temperature interval +208.69-292.36° C. (peak 288.67° C.). The first stage is endothermic, and the second stage is exothermic. As a result of thermal iron (II) oxalate decomposition, the nano-sized alpha-hematite is formed, and $CO_2$ is formed as outgoing conversion gas. The thermal decomposition of produced iron (II) oxalate in the nitrogen atmosphere takes place in the temperature interval +399.14-488.15° C. (peak 457.42° C.). The decomposition process is endothermic. As a result of this decomposition the nano-sized magnetite is formed and mixture CO and $CO_2$ is formed as a conversion outgoing gas. The thermal decomposition of iron (II) oxalate in an atmosphere of its own conversion gases takes place in the temperature interval +230-370° C. (peak 320° C.).

The first 10 kg of produced dry iron (II) oxalate dihydrate were put into an oven and heated in the air atmosphere at +220° C. during 1 h. After complete dehydration, the exothermic stage was started and temperature was set at +300° C. At this temperature the iron (II) decomposition was continued during 2 h. All outgoing gases were transferred by pumps through column filled with water solution of NaOH for neutralization. As a result of calcinations, 4.4 kg of red powder were produced. According to the XRD (X-ray Difraction) analysis made in the laboratory of Ben Gurion University, the obtained red powder was alpha-hematite. It was studied under SEM (Scanner Electronic Microscope), which showed that according EDS (Electron Diffraction Spectrum) the red powder contained 99.9% of $Fe_2O_3$ and it consisted of spherical particles of a size from 35 to 50 nm. The obtained nano-sized red iron oxide is very dispersed and looks fluffy; it does not need milling or other processing. Its bulk density was 0.35-0.4 kg/l.

The samples from gas absorption column liquid showed the presence of $Na_2CO_3$, formed as a result of reaction between NaOH and outgoing $CO_2$. The second 10 kg of produced iron (II) oxalate dihydrate were filled into completely closed metallic container which was placed into muffler. This container was connected by pipe with absorber filled by NaOH solution. The muffler with iron (II) oxalate dihydrate was heated at +488° C. during 3 h. After cooling it was obtained 4.3 kg of black super paramagnetic powder which was tested under SEM (Scaner Electronic Microscope) and by XRD (X-Ray Difraction). The tests results showed that powder is magnetite, contained 99.5% of $Fe_3O_4$ and consisted of spherical particles with a size of 30-60 nm. Samples of water suspension from the absorber consisted of a mixture of NaOH and $Na_2CO_3$. The $Na_2CO_3$ was formed as a result of reaction between outgoing gas $CO_2$ and NaOH inside gas absorber.

Example 2

The galvanic waste pickle liquor of the second example has the following composition: ferrous sulfate 130 g/l of $Fe^{2+}$, free sulfuric acid 12 g/l (or 1.2%), about 3% inhibitor additive, and balance water. After filtering 50 l of this liquor were fed to 150 l glass reactor with stirrer and 11.25 kg (stoichiometric to 100 g/l of $Fe^{2+}$) of oxalic acid dihydrate were added into solution with stirring 150 rpm at ambient temperature (+23° C.). After oxalic acid dihydrate addition the temperature of mixture was decreased till +19° C. The reaction between ferrous sulfate and oxalic acid was started immediately and it was continued for 4 hours. The temperature of the mixture at the end of the reaction was ambient (+23° C.) again. As a result of reaction 16.0 kg of yellow precipitate of iron (II) oxalate dihydrate was obtained, and 175 g/l of sulfuric acid was regenerated. The total acid quantity in the slurry was 187 g/l, or 18.7%. Slurry of iron (II) oxalate dihydrate in the water solution of 18.7% sulfuric acid was filtered on the membrane filter. The filtrate (40 liters) was collected and tested on the ferrous sulfate and sulfuric acid quantities. The analysis showed the presence, in filtrate, of 30 g/l of $Fe^{2+}$, 187 g/l of free sulfuric acid, about 3.0% of inhibitor additive and 76% balance water. The obtained solution is suitable for the use in the pickling process. The filtration cake contained 85% of solid material—iron (II) oxalate dihydrate and 15% of mother liquor of regenerated pickling sulfuric acid. The cake of iron (II) oxalate dihydrate was washed by fresh water until visual absence of $SO_4^{-}$ anions in the washing water. The $SO_4^{-}$ anions presence was tested by addition of 1% solution of $BaCl_2$ into washing water (it is formed a white precipitated of $BaSO_4$ after addition of several drops of $BaCl_2$ solution into washing water). The washed cake of iron (II) oxalate dihydrate was dried in the drying oven at temperature +100-105° C. The weight of dry iron (II) oxalate dihydrate was 16 kg. It was used for the thermal decomposition and nano-sized iron oxides production: 5 kg for the hematite production and 5 kg for the magnetite production.

The process of calcination of iron (II) oxalate dihydrate was the same as described in the example 1. As a result of the first 5 kg iron (II) oxalate dihydrate calcination in the air atmosphere at +288° C., 2.2 kg of nano-sized alpha-hematite were obtained. According to the EDS analysis the produced alpha-hematite is very pure (99.7% of $Fe_2O_3$), under SEM it is consisted of spherical particles with a size of 35-50 nm. As a result of the second 5 kg iron (II) oxalate dihydrate calcination in the atmosphere its conversion gases at +488° C., 2.1 kg of nano-sized magnetite were obtained. According to EDS the produced magnetite is very pure (99.4% of $Fe_3O_4$), under SEM it is consisted of spherical particles with a size of 38-60 nm. The obtained magnetite is super paramagnetic. The outgoing gases were neutralized inside the absorber by reaction with NaOH.

While this invention has been described in terms of some specific examples, many modifications and variations are possible. It is therefore understood that within the scope of the appended claims, the invention may be realized otherwise than as specifically described.

The invention claimed is:

1. A process for recycling spent pickling acids, comprising
   i) providing a spent pickling liquor comprising hydrochloric or sulfuric acid, and dissolved iron;
   ii) measuring the concentration of said dissolved iron; and
   iii) adding solid oxalic acid into said liquor in an amount corresponding to 75-80% of the stoichiometric amount necessary for the complete reaction with said dissolved iron;
   iv) stirring the mixture and reacting said dissolved iron with said added oxalic acid;
   v) removing the formed solid iron oxalate from said mixture, washing said solid iron oxalate, drying said washed solid iron oxalate; and
   vi) calcining the dried iron oxalate at a temperature of up to 500° C.;
   thereby obtaining a pure nanopowder of iron oxide, and regenerated acids for repeated use in pickling.

2. The process according to claim 1, comprising washing said solid iron oxalate by water until the pH of 4.5-7 in the wash water, drying said washed iron oxalate at 90-105° C. thereby obtaining a powder of iron oxalate dihydrate, and calcining the dried iron oxalate dihydrate thereby obtaining a powder of iron oxide.

3. The process according to claim 1, comprising washing and drying said solid iron oxalate, and calcining the dried iron oxalate at 200-300° C. in the atmosphere of dry air, thereby obtaining a red powder of nano-sized α-hematite.

4. The process according to claim 1, comprising washing and drying said solid iron oxalate, and calcining the dried iron oxalate at 290-350° C. in the atmosphere of conversion gases or at 450-500° C. in the atmosphere of nitrogen, thereby obtaining a black powder of magnetite.

5. The process according to claim 1, wherein said pickling liquor comprises 10-15 g/l of hydrochloric or sulfuric acid, 3-5 g/l of inhibitor additive, and 130-150 g/l of $Fe^{2+}$ as ferrous chloride or ferrous sulfate.

6. The process according to claim 3, further comprising absorbing carbon dioxide released during said calcining into NaOH, thereby obtaining sodium carbonate.

7. The process according to claim 4, further comprising burning carbon monoxide released during said calcining to produce carbon dioxide, and absorbing said carbon dioxide into NaOH, thereby obtaining sodium carbonate.

8. The process according to claim 3, wherein said α-hematite has a bulk density of 0.35-0.40 kg/l, and a particle size of 35-50 nm.

9. The process according to claim 4, wherein said magnetite has a bulk density of 0.45-0.50 kg/l, and a particle size of 30-60 nm.

* * * * *